United States Patent
Swisher

(10) Patent No.: US 7,354,191 B2
(45) Date of Patent: Apr. 8, 2008

(54) MORTAR MIXER AND TRUNNION ASSEMBLY

(75) Inventor: James A. Swisher, Jacksonville, FL (US)

(73) Assignee: Stone Construction Equipment, Inc, Honeoye, NY (US)

( * ) Notice: Subject to any disclaimer, the term of this patent is extended or adjusted under 35 U.S.C. 154(b) by 0 days.

(21) Appl. No.: 11/584,029

(22) Filed: Oct. 21, 2006

(65) Prior Publication Data
US 2007/0070806 A1 Mar. 29, 2007

Related U.S. Application Data

(63) Continuation of application No. 10/750,725, filed on Jan. 2, 2004.

(51) Int. Cl.
*B28C 5/14* (2006.01)
*F16J 15/32* (2006.01)

(52) U.S. Cl. ................................ 366/331; 277/562

(58) Field of Classification Search ............ 366/64–67, 366/96–99, 312–313, 331; 277/552, 562, 277/563, 549
See application file for complete search history.

(56) References Cited

U.S. PATENT DOCUMENTS

| | | | | |
|---|---|---|---|---|
| 3,318,606 A | * | 5/1967 | Houck .................. 277/431 |
| 3,375,014 A | * | 3/1968 | Chubb et al. ............ 277/408 |
| 3,415,581 A | * | 12/1968 | Seubert ................. 384/131 |
| 3,869,131 A | * | 3/1975 | Derner .................. 277/346 |
| 3,921,962 A | * | 11/1975 | Feger et al. ............. 366/64 |
| 3,932,006 A | * | 1/1976 | Tertinek et al. ........... 384/462 |
| 3,934,311 A | * | 1/1976 | Thompson .............. 452/13 |
| 3,937,446 A | * | 2/1976 | Feger et al. ............. 366/66 |
| 4,097,926 A | * | 6/1978 | Face, Jr. ................ 366/46 |
| 4,850,723 A | * | 7/1989 | Whiteman, Jr. .......... 384/477 |
| 5,094,540 A | * | 3/1992 | Face, Jr. ................ 366/46 |
| 5,105,636 A | * | 4/1992 | Anastase et al. ......... 68/140 |
| 5,277,489 A | * | 1/1994 | Hamm .................. 366/2 |
| 5,735,603 A | * | 4/1998 | Kesig et al. ............. 366/331 |
| 5,927,864 A | * | 7/1999 | Feerick ................. 384/482 |
| 6,435,515 B1 | * | 8/2002 | Galletti ................. 277/407 |
| 6,616,326 B2 | * | 9/2003 | White ................... 366/331 |
| 7,025,506 B2 | * | 4/2006 | Varel et al. ............. 384/477 |

(Continued)

FOREIGN PATENT DOCUMENTS

DE 3736435 A1 * 5/1989

(Continued)

Primary Examiner—Charles E. Cooley
(74) Attorney, Agent, or Firm—Jacobson Holman PLLC

(57) ABSTRACT

A mortar mixer includes a substantially cylindrical drum having end plates supporting trunnion assemblies, with housings, having an interior space defined by an interior surface around the paddle shaft. A first seal is located adjacent the end plate and is positioned around the shaft and is mounted between the shaft and the interior surface. A second seal is spaced outwardly from the first seal and positioned around the shaft between the shaft and the affixed interior surface. The first and second seals partition a portion of the interior space to define a first chamber for carrying grease. The second seal is spaced away from a shaft bearing to partition a second portion of the interior space to define a second chamber for carrying grease which forms a positive seal to prevent contaminated grease from entering the bearing when the first chamber is purged of contaminated grease.

20 Claims, 3 Drawing Sheets

U.S. PATENT DOCUMENTS

| | | | |
|---|---|---|---|
| 2002/0057626 A1* | 5/2002 | Schafer et al. | 366/331 |
| 2005/0146096 A1* | 7/2005 | Swisher | 277/562 |
| 2007/0070806 A1* | 3/2007 | Swisher | 366/331 |
| 2007/0241514 A1* | 10/2007 | Orlowski et al. | 277/549 |

FOREIGN PATENT DOCUMENTS

| | | | |
|---|---|---|---|
| JP | 06055052 A | * | 3/1994 |
| JP | 2005-28854 | * | 2/2005 |

* cited by examiner

US 7,354,191 B2

MORTAR MIXER AND TRUNNION ASSEMBLY

CROSS-REFERENCE TO RELATED APPLICATION

This application is a continuation of application Ser. No. 10/750,725, filed Jan. 2, 2004.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to seals for trunnions and particularly to seals for trunnions used in mortar mixing drums.

2. Relevant Art

Trunnions used in mortar mixing drums employ sealing apparatus including a single set of resilient seals with lips biased against the paddle shaft and facing the interior space of the drum. A single grease chamber is formed by and positioned outwardly of the set of seals away from the drum. Conventional trunnions allow the contaminated grease to be pushed outwardly into the trunnion/shaft bearing area as the seal/shaft interface shows wear and tear over a period of time. What is desired is a sealing system that increases the protection of the shaft bearing.

BRIEF SUMMARY OF THE INVENTION

In one aspect of the present invention there is provided a trunnion assembly for a mortar mixer including a substantially cylindrical drum having end plates and an elongate paddle shaft mounted horizontally and extending into a bearing through each drum end plate into a bearing carried by the trunnion assembly, trunnion assembly comprising a housing having an interior space defined by an interior surface around such shaft, a first seal means adjacent an end plate and positioned around such shaft. First mounting means affixes the first seal means between such shaft and the interior surface and a second seal means spaced outwardly from the first seal is positioned around such shaft. Second mounting means provides for affixing the second seal between such shaft and the interior surface, the first and second seal means partitioning a portion of the interior space to define a first chamber for carrying grease and the second seal means being spaced away form a shaft bearing to partition a second portion of the interior space to define a second chamber for carrying grease. The first seal means includes a plurality of resilient seal elements, each seal element having one end portion in contact with such shaft. The second seal means includes a single resilient seal element having one end portion in contact with such shaft. The second seal means includes a single resilient seal element having one end portion in contact with such shaft. The second seal means includes a resilient seal element having one end portion in contact with such shaft. The housing includes a first second passageway into the interior space for supplying grease into respective first and second chambers. In another aspect of the present invention there is provided a pair of trunnion assemblies for the paddle shaft of a mortar mixer including a substantially cylindrical drum having end plates, each trunnion assembly comprising a housing, the housing having an interior space defined by an interior surface around such shaft. A first seal means is adjacent an end plate positioned around such shaft and a first mounting means provides for affixing the first seal means between such shaft and the interior surface. A second seal means is spaced outwardly from the first seal and positioned around such shaft and second mounting means for affixing the second seal between such shaft and the interior surface. The first and second seal means partitions a portion of the interior space to define a first chamber for carrying grease, the second seal means being spaced away from a shaft bearing to partition a second portion of the interior space to define a second chamber for carrying grease. The first seal means includes a plurality of resilient seal elements, each having one end portion in contact with such shaft. The second seal means includes a single resilient seal element having one end portion in contact with such shaft.

Second seal means includes a resilient seal element having one end portion in contact with such shaft. The housing includes a first and second passageway into the interior space for supplying grease into respective first and second chambers.

Another aspect of the present invention provides an improved trunnion assembly that includes a housing including a first and second end portion and an interior space defined by an interior surface for a shaft and a bearing mounted in the second end portion for such shaft, the improvement comprising a first seal means adjacent the first end portion and positioned around such shaft, the first seal means including at least one first seal element and mounting means for mounting the at least one seal element to the interior surface and in contact with such shaft. A second seal means is spaced away from the first seal means including at least one second seal element and mounting means for mounting the at least one second seal element to the interior surface and in contact with such shaft, a portion of the interior space between the at least one first seal element and the at least one second seal element defining a first chamber for carrying lubricating material therein and a portion of the interior space between the at least one second seal element and a bearing mounted in the end portion defining a second chamber for carrying lubricating material therein. The first seal means includes a plurality of resilient seal elements each having one end portion in contact with such shaft. The second seal means includes a single resilient seal element having one end portion in contact with such shaft.

Second seal means includes a first and second passageway into the interior space for supplying grease into respect first and second chambers.

The present invention also provides improved rotatable trunnion assemblies for a rotatable mixing apparatus, each trunnion assembly including a first and second end portion and an interior space defined by an interior surface for a shaft and a bearing mounted in the second end portion for such shaft, the improvement comprising a first seal means adjacent the first end portion and positioned around such shaft. The first seal means includes at least two first seal elements and mounting means for mounting each first seal element to the interior surface and in contact with such shaft, a second seal means spaced away from the first seal means including at least one second seal element and mounting means for mounting the at least one second seal element to the interior surface and in contact with such shaft. A portion of the interior space between the at least one first seal element and the at least one second seal element defining a first chamber for carrying lubricating material therein, a portion of the interior space between the at least one second seal element and a bearing mounted in the end portion defining a second chamber for carrying lubricating material therein. The first seal means includes three resilient seal elements, each having one end portion in contact with such shaft. The second seal means includes a single resilient seal element having one end portion in contact with such shaft. Each first seal element includes a resilient seal member having one end portion in contact with such shaft. The housing includes a first and second passageway into the interior space for supplying grease into the respective first and second chambers.

BRIEF DESCRIPTION OF THE SEVERAL VIEWS OF THE DRAWING

The novel features which are believed to be characteristic of this invention are set forth with particularity in the appended claims. The invention itself, however, both as to its organization and method of operation, together with further objects and advantages thereof, may best be understood by reference to the following description, taken in connection with the accompanying drawings, in which:

DETAILED DESCRIPTION OF THE INVENTION

Introduction

Mortar and plaster mixers provide a seal and a grease chamber. Due to wear and tear, the mortar slurry may enter into the trunnion housing and travel into the shaft bearing. When grease is pumped into the grease chamber in an effort to purge the contaminated grease into the mixer drum, the contaminated grease may be forced into the bearing area thereby damaging the mixing apparatus.

The present design utilizes two grease chambers and seals:

A single seal with two metal support washers forms the first outer grease chamber and is back loaded into the trunnion with the seal lip on the paddle shaft facing the drum and held in position by a locking collar. A side hole in the locking collar must be lined up with the threaded hole where the Zerk fitting is screwed in. This alignment will allow grease to flow through the collar and into this chamber while the locking collar holds the rubber seal between two metal washers in the correct position. When fresh grease is forced into this chamber, the old grease will be purged either into the front chamber or exit through the drum bearing area.

A triple seal completes the second inner grease chamber closest to the drum and is front loaded into the trunnion housing with all three seal lips on the paddle shaft facing into the mixer's drum. These three seals are held in position by trunnion mounting bolts. Because the chamber has a positive outer seal, the fresh grease can now push all the contaminated grease back into the mixer's drum when the grease is forced into the inner chamber.

Figure 1:
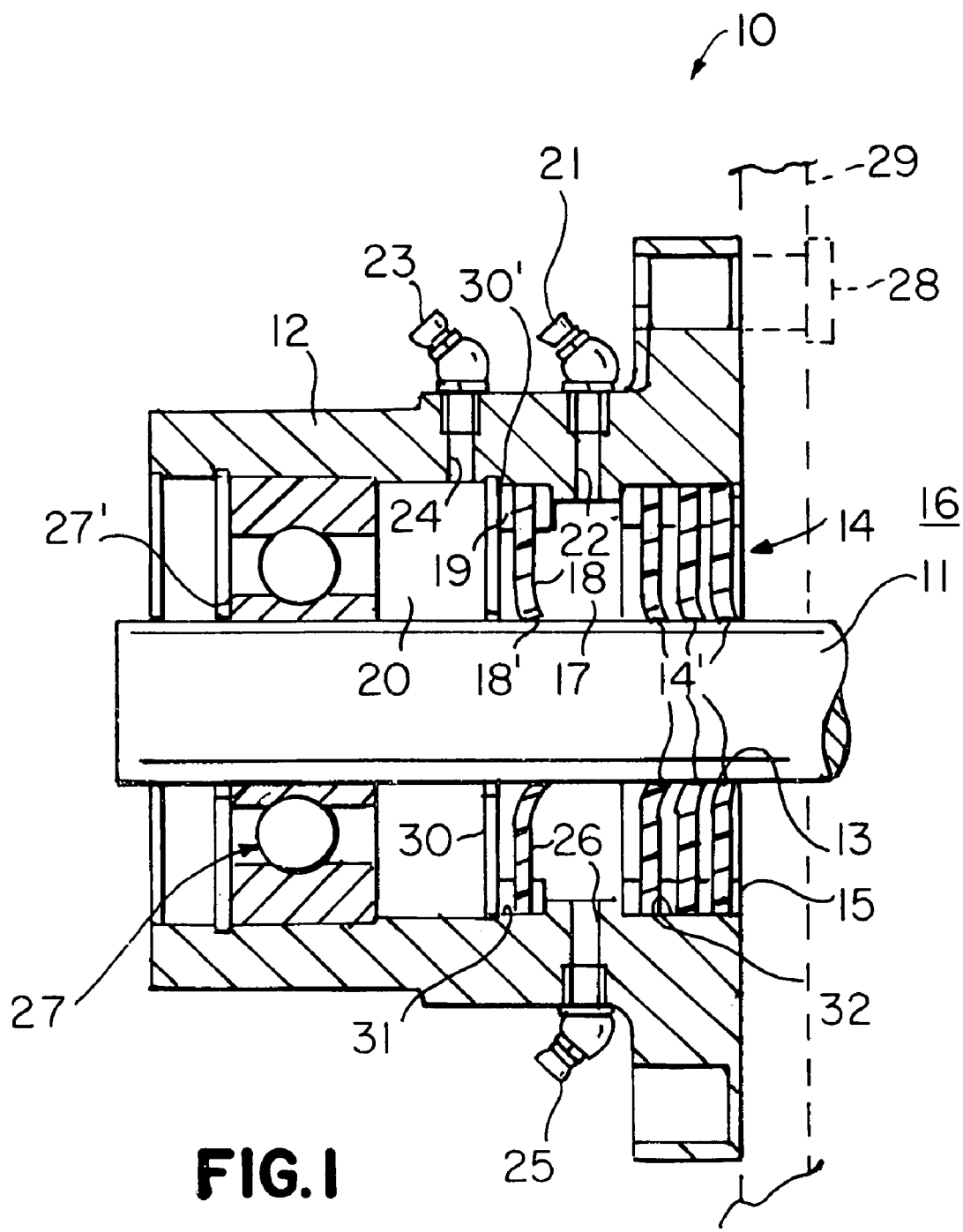
FIG. 1 is a cross-sectional pictorial view of a trunnion assembly employing a twin grease chamber system in accord with the present invention.

With respect now to the drawings, a trunnion assembly is illustrated in FIG. 1 at numeral 10. A paddle shaft 11 is mounted in interior space 13 in trunnion housing. 12. A first set of drum seals 14 is held in place at the front (inward portion) of housing 12 via metal support fitting 15. The seals 14 are mounted to orient lips 14' toward the interior space 16 of the mixer drum.

The drum seal includes inner grease storage chamber 17, a second drum seal 18 held in place via metal fitting 19 with seal lip 18' oriented towards the front of the assembly housing 12. Grease is supplied to chamber 17 via Zerk grease fittings 21 and 25 and passageways 22 and 26 respectively. The seals 14 and 18 partition a portion of interior space 13. The shaft bearing seal protects the bearing assembly 27 positioned via snap ring 27' and includes outer grease chamber 20 that is supplied via Zerk grease fitting 23 and passageway 24.

Snap ring 30 is mounted in groove 30' adjacent channel 31 into which fitting 19 is mounted to hold fitting 19/seal 18 in place. Inner seals 14 and fitting 15 are mounted into channel 32 formed by housing 12 and drum end plate 29.

Grease forced into the inner grease chamber 17 exits inwardly into drum interior space 16 because of the positive outer seal provide by seal 18 and filled chamber 20.

Trunnion 10 is secured to end plate 29 of the mixing drum via a plurality of bolts 28 as needed.

Figure 2:
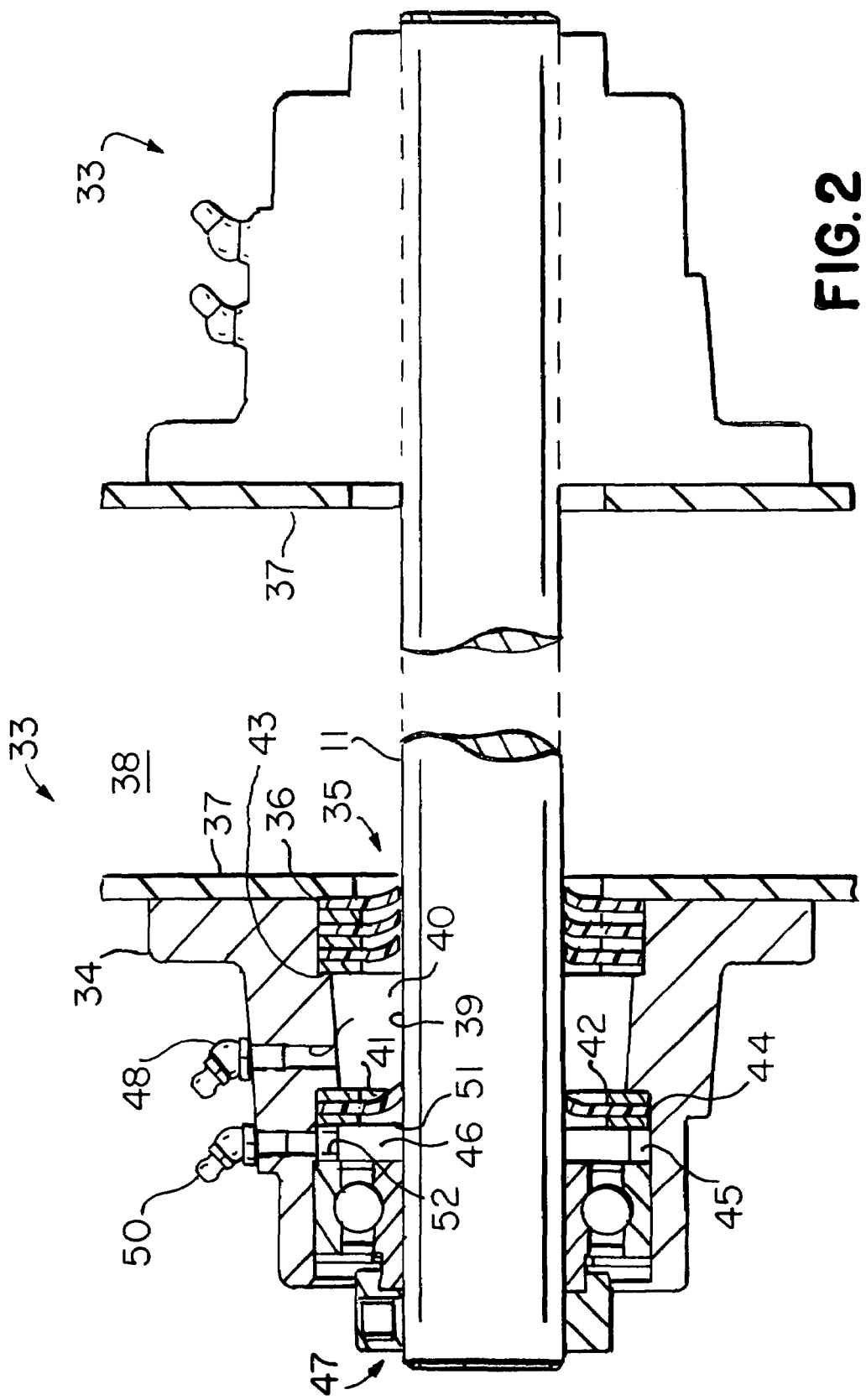
FIG. 2 is a cross-sectional pictorial view of an alternate embodiment of a pair of identical trunnion assemblies in accord with the present invention.

An alternate embodiment is illustrated by a pair of spaced identical trunnion assemblies 33 in FIG. 2. The trunnion housing 34 provides shaft passageway 39 into drum interior 38 to provide an outer grease storage chamber 46 smaller than chamber 20 and an inner grease chamber 40 that is larger than chamber 17 as described above in FIG. 1. It is understood that the trunnion assembly 10 of FIGS. 1 and 53 of FIG. 3 usually would be used as spaced pairs on opposite sides of a mortar mixer.

The first set of seals 35 is substantially the same as described above regarding FIG. 1. Support fitting 36 fits into channel 43, which includes a portion of drum end plate 37. Outer seal 41 is mounted via fitting 42 that is seated into channel 44 that is completed by ring 45 and forms grease chamber 46. Shaft bearing 47 is protected from contamination by chamber 46. Zerk fittings 48 and 50 provide grease via respective passageways 49 and 51. Ring 45 includes an opening 52 that is aligned with the passageway 51.

Figure 3:
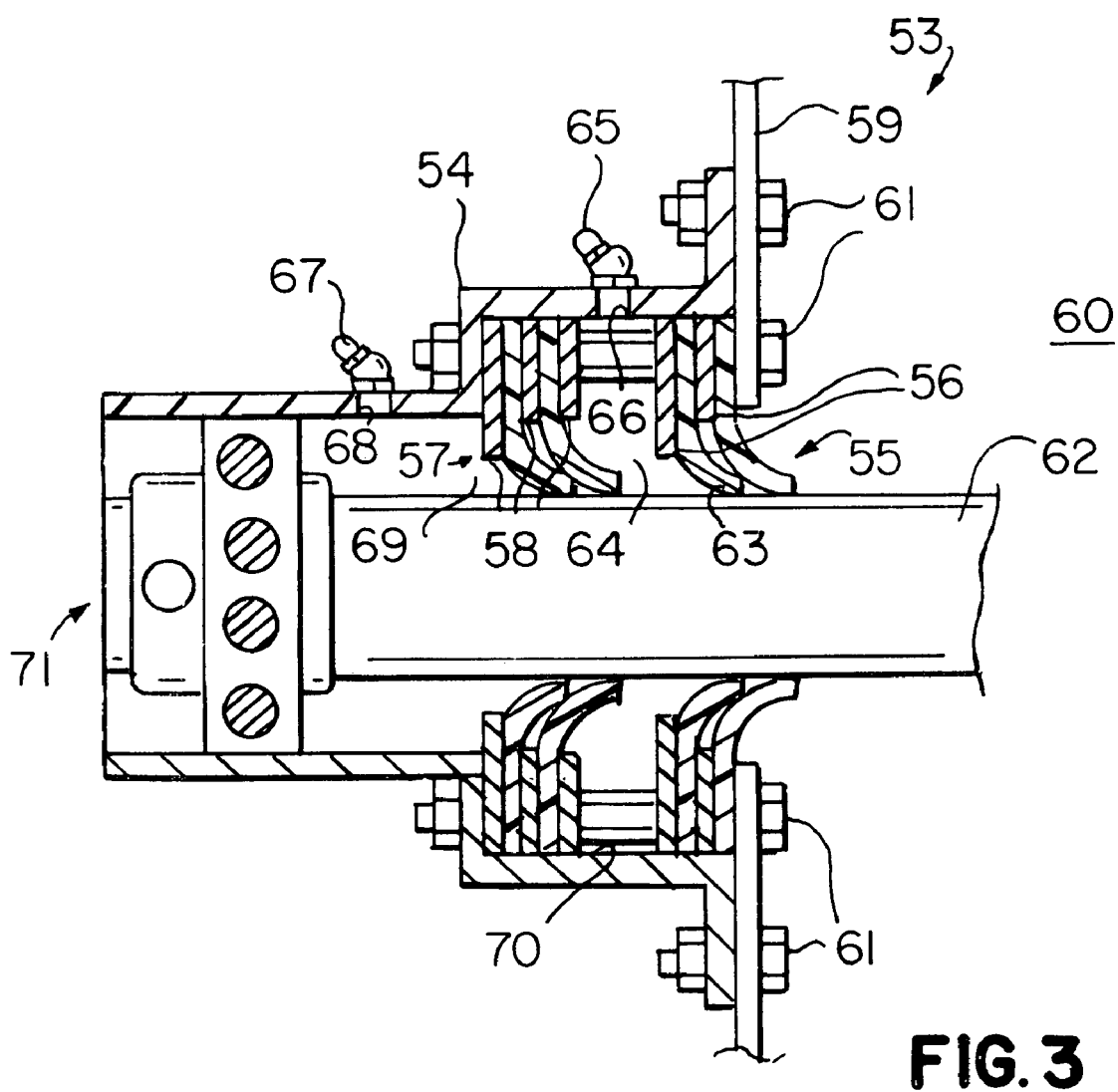
FIG. 3 is a cross-sectional pictorial view of another embodiment of the trunnion assembly in accord with the present invention.

In FIG. 3 another embodiment of the trunnion 53 in accord with the present invention is shown. Trunnion housing 54 provides passageway 63 for paddle shaft 62. Trunnion 53 is mounted to end plate 59, partly defining interior space 60, via bolts 61.

The inner, first set of drum seals 55 includes two elements secured via metal spacer fittings 56 against shaft 62 (mounted in passageway 63) as described hereinabove. An outer, second set of drum seals 57 includes two elements secured into place via metal spacer fittings 58. Metal bolts 61 secure drum end plate 59 to trunnion 53. Trunnion housing 54 is formed to provide a channel 70 into which seals 55 and 57 and fittings 56 and 58 are mounted and secured via bolts 61 therethrough.

Zerk fittings 65 and 67 and associated passageways 66 and 68 respectively provide grease into first inner grease chamber 64 which is defined by the space between the seal sets 55 and 57 and respective second outer grease chamber 69 defined between seal set 57 and shaft bearing assembly 71.

The specific embodiment of FIGS. 1-3 chosen in a particular application depends on the size of the associated mixing drum and the speed and loading on the paddle shaft which itself contributes to the choice of shaft bearing used.

In summary, the present trunnion is attached to the drum by four ½" bolts. The mixers are "dry cleaned" daily with a mason's hammer and the drum's end plate can become deformed. Thus four spaced ½" bolts, instead of three 5/16, or four 3/8, are used to minimize deformity of the plate adjacent the trunnion attachment.

The present trunnion also employs a vinyl cover to protect the trunnion from mortar splash. Such cover also protects the Zerks from becoming encased in mortar.

By protecting the paddle shaft bearing with its own unique chamber of fresh grease that cannot be contaminated with mortar slurry form the drum, the life of the bearing is greatly extended at minimum expense. When a bearing fails the paddle shaft drops because it has lost its designed support tolerance and then severe consequential damage occurs as the paddles begin to rub and then cut into the drum. This design improvement affords definite bearing life extension and proper functioning of the mixers.

The "side by side" grease chambers are also unique. The outside grease chamber or "the bearing grease chamber", when pressurized with grease, the grease is fed in two directions (1) into the front drum seal grease chamber and (2) backwards into the paddle shaft bearing. The drum seal arease chamber, when pressurized with crease can feed in only one direction, back into the drum, thus providing the ability to purge this grease chamber of all contaminated grease, and extending the life of the drum seals. The contaminated grease is forced back into the drum and never backwards into the bearing as is the case in most mixer designs.

The "bearing grease chamber" 20, 46, 69 contains grease specifically for the outside chamber which is adjacent the shaft bearing assembly 27. Because the inner chamber 17 is physically distinct, a different type of grease may be supplied that is adapted for excluding mortar material (or other material used in the drum) out of contact with the shaft adjacent the bearing assembly 27. It is understood that in the present invention of the trunnion assembly, different greases inherently may be used in the respective chambers as appropriate to maximize the life of the bearing and the trunnion assembly.

All the seal lips in the improved trunnion face toward the interior space of the drum.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed is:

1. A mortar mixer comprising a trunnion assembly and a substantially cylindrical drum having end plates and an elongate paddle shaft defining an axis having a uniform diameter mounted horizontally and extending through an opening in one end plate into a bearing carried by said trunnion assembly, said trunnion assembly including a housing attached outwardly of said end plate and having all components of said trunnion assembly disposed outwardly of said end plate, said housing having an interior space defined by an interior surface around said shaft, a first seal means adjacent said end plate and positioned around and engaged with said shaft, first mounting means for affixing said first seal means between said shaft and said interior surface, a second seal means spaced outwardly from said first seal and positioned around and engaged with said shaft, second mounting means for affixing said second seal between said shaft and said interior surface, said first and second seal means being axially spaced in said interior space to define a first generally annular chamber therebetween around said shaft for carrying grease, said second seal means being axially spaced from said bearing in said interior spaced to define a second generally annular chamber therebetween around said shaft for carrying grease, said housing including a first grease passageway for providing grease into said first chamber to purge mortar contaminated grease therein back into said drum through said opening in said one end plate, and a second grease passageway spaced away from said first grease passageway for providing grease into said second chamber to grease said bearing and inhibit egress of mortar to said bearing, and said first and second grease passageways being separate, distinct and non-communicating with each other such that said first and second chambers are individually periodically pressured and greased respectively from said first and second grease passageways.

2. The mortar mixer as defined in claim 1 wherein said first seal means includes a plurality of resilient seal elements, each said seal element having one end portion in contact with said shaft.

3. The mortar mixer as defined in claim 2 wherein said second seal means includes a single resilient seal element, said single seal element having one end portion in contact with said shaft.

4. The mortar mixer as defined in claim 1 wherein said second seal means includes a resilient seal element, said seal element having one end portion in contact with said shaft.

5. The mortar mixer as defined in claim 1 wherein said first and second seal means include lip seals having lips facing toward said drum whereby contaminated grease in said first chamber is purged back into said drum when pressurized by grease from said first passageway.

6. A mortar mixer comprising a pair of spaced trunnion assemblies and a paddle shaft defining an axis extending therebetween and a substantially cylindrical drum having end plates, each said trunnion assembly including a housing attached to respective said end plate and having all components of said trunnion assembly disposed outwardly of respective said end plate, said housing having an interior space defined by an interior surface around such shaft, a first seal means adjacent one said end plate and positioned around and in contact with said shaft, first mounting means for affixing said first seal means between said shaft and said interior surface, a second seal means spaced outwardly from said first seal means and positioned around and in contact with said shaft, second mounting means for affixing said second seal means between said shaft and said interior surface, said first and second seal means being axially spaced in said interior space to define a first generally annular chamber therebetween around said shaft for carrying grease, said second seal means being axially spaced away from said shaft bearing in said interior space to define a second generally annular chamber therebetween around said shaft for carrying grease to grease said bearing, each said housing including a pair of spaced grease fittings through which grease is periodically supplied, a first passageway communicating between one of said grease fittings and said first chamber to purge mortar contaminated grease therein back into said drum through said end plates about said paddle shaft, and a second passageway communicating between another of said grease fittings and said second chamber, said grease passageways being separate, distinct and non-communicating such that said chambers are periodically individually pressurized and greased via respective said grease fittings.

7. The mortar mixer as defined in claim 6 wherein said first seal means includes a plurality of resilient seal elements, each said seal element having one end portion in contact with said shaft.

8. The mortar mixer as defined in claim 7 wherein said second seal means includes a single resilient seal element, said single seal element having one end portion in contact with said shaft.

9. The mortar mixer as defined in claim 6 wherein said second seal means includes a resilient seal element, said seal element having one end portion in contact with said shaft.

10. The mortar mixer as defined in claim 6 wherein said second seal means includes a resilient seal element, said seal element having one end portion in contact with said shaft.

11. In a mortar mixer comprising a trunnion and shaft assembly that includes a housing having a first and second end portion and an interior cylindrical space for receiving a shaft medially therethrough, said shaft having a uniform diameter and defining an axis and a bearing mounted in said second portion for said shaft, a first seal means adjacent said first end portion and engagable with and around said shaft, said first seal means including at least one first seal element and mounting means for mounting said at least one seal element to said interior surface of said housing, a second seal means within said, housing and engagable with and around said shaft, said second seal means being spaced away from said first seal means, said second seal means including at least one second seal element and mounting means for mounting said at least one second seal element to said interior surface of said housing, said first and second seal elements being axially spaced in said interior space to define a first generally annular chamber therebetween around said shaft for carrying grease, said second seal element being axially spaced from said bearing in said interior space to define a second generally annular chamber therebetween around said shaft for carrying grease to grease said bearing, a first grease fitting and a first passageway communicating between said first grease fitting and said first chamber when pressurized with grease purging mortar contaminated grease therein back into said drum around said shaft, a second grease fitting spaced away from said first grease fitting and a second passageway spaced away from said first passageway communicating between said second grease fitting and said second chamber when pressurized with grease providing grease to said bearing and inhibit egress of mortar to said bearing, and said grease fittings being adapted to receive pressurized grease periodically therethrough to provide grease into respective said first and second chambers.

12. In the mortar mixer as defined in claim 11 wherein said first seal means includes a plurality of resilient seal elements, each said seal element having one end portion in contact with said shaft.

13. In the mortar mixer as defined in claim 12 wherein said second seal means includes a single resilient seal element, said single seal element having one end portion in contact with said shaft.

14. In the mortar mixer as defined in claim 11 wherein said second seal means includes a resilient seal element, said seal element having one end portion in contact with said shaft.

15. In the mortar mixer as defined in claim 11 wherein said second seal means includes a resilient seal element, said seal element having one end portion in contact with said shaft.

16. In a mortar mixer comprising a pair of spaced trunnions and a shaft therebetween, each trunnion assembly including a housing having a first and second end portion and an interior space defined by an interior surface of said housing, a shaft defining an axis extending through said housing and supported by a bearing mounted in each said second end portion, a first seal means within said housing and adjacent said first end portion and positioned in contact around said shaft, said first seal means including at least two first seal elements, mounting means for mounting each said first seal element to said interior surface of said housing, a second seal means within said housing and engaged engagable with and around said shaft spaced away from said first seal means, said second seal means including at least one second seal element, mounting means for mounting said at least one second seal element to said interior surface of said housing and in contact with said shaft, said at least one first seal element and said at least one second seal element being axially spaced in said interior space to define a first generally annular chamber therebetween around said shaft for carrying grease, said at least one second seal element being axially spaced from said bearing in said interior space to define a second generally annular chamber therebetween around said shaft for carrying grease to grease said bearing, a pair of spaced grease fittings and a pair of elongated spaced passageways respectively connecting said grease fittings with said first and second chambers, and said grease fittings being adapted to receive pressurized grease periodically therethrough to provide grease into respective said first and second chambers to respectively purge mortar contaminated grease therein back into said drum around said shaft and to inhibit egress of mortar to said bearing.

17. In the mortar mixer as defined in claim 16 wherein said first seal means includes three resilient seal elements, each said seal element having one end portion in contact with said shaft.

18. In the mortar mixer as defined in claim 17 wherein said second seal means includes a single resilient seal element, said single seal element having one end portion in contact with said shaft.

19. In the mortar mixer as defined in claim 16 wherein each said first seal element includes a resilient member, said member having one end portion in contact with said shaft.

20. In the mortar mixer as defined in claim 16 wherein said second seal means includes at least two resilient seal elements having free ends in contact with said shaft.

* * * * *